United States Patent
Cochran et al.

(10) Patent No.: US 10,882,306 B2
(45) Date of Patent: Jan. 5, 2021

(54) METHOD AND SYSTEM FOR DECORATOR COMPONENT IDENTIFICATION AND SELECTED ADJUSTMENT THEREOF

(75) Inventors: Don W. Cochran, Gates Mills, OH (US); Roger A. Baker, Festus, MO (US)

(73) Assignee: PRESSCO TECHNOLOGY INC., Cleveland, OH (US)

( * ) Notice: Subject to any disclaimer, the term of this patent is extended or adjusted under 35 U.S.C. 154(b) by 0 days.

(21) Appl. No.: 13/277,157

(22) Filed: Oct. 19, 2011

(65) Prior Publication Data
US 2012/0216689 A1    Aug. 30, 2012

Related U.S. Application Data

(60) Provisional application No. 61/394,619, filed on Oct. 19, 2010.

(51) Int. Cl.
*B41F 17/22* (2006.01)
*B41M 1/40* (2006.01)
(Continued)

(52) U.S. Cl.
CPC ............ *B41F 17/22* (2013.01); *B41F 17/002* (2013.01); *B41F 33/0036* (2013.01);
(Continued)

(58) Field of Classification Search
CPC .......... B41F 17/22; B41F 17/18; B41F 17/20; B41F 33/0036; B41F 33/16; B41M 1/26; B41M 1/40
(Continued)

(56) References Cited

U.S. PATENT DOCUMENTS 3,828,668 A * 8/1974 Zugcic ............................. 101/40
4,337,719 A   7/1982 vander Griendt et al.
(Continued)

FOREIGN PATENT DOCUMENTS

| CN | 87106769 A | 5/1988 |
|---|---|---|
| CN | 101674940 A | 3/2010 |

(Continued)

OTHER PUBLICATIONS

International Search Report for PCT/US11/56967 dated Mar. 20, 2012.
(Continued)

*Primary Examiner* — Leslie J Evanisko
(74) *Attorney, Agent, or Firm* — Fay Sharpe LLP (57) ABSTRACT

Automated inspection technology is integrated with a cylindrical container print decorator machine to optimize the decoration process by making critical process and machine information properly and immediately available for corrective adjustments to the process. With this information, a high speed decoration machine operator will be made directly aware of the portions or subsystems of the decorator machine not functioning properly. The information directly facilitates, and can even recommend, corrective adjustments that are necessary to the decorator to better optimize printing functions. It is possible to use this information to optimize the operation of the decorator. It is possible to use this information by way of a properly configured control system, after specific augmentation capabilities are added to the decorator machine, to automatically close the loops with specific decorator printing machine parts or subsystems to dramatically improve the decorating process even while the machine is printing.

61 Claims, 4 Drawing Sheets

(51) Int. Cl.
*B41F 33/02* (2006.01)
*B41F 33/00* (2006.01)
*B41F 17/00* (2006.01)
*G01N 21/956* (2006.01)
*B41M 1/06* (2006.01)
*G01N 21/952* (2006.01)

(52) U.S. Cl.
CPC .............. *B41F 33/02* (2013.01); *B41M 1/40* (2013.01); *B41M 1/06* (2013.01); *G01N 21/952* (2013.01); *G01N 21/956* (2013.01)

(58) Field of Classification Search
USPC .............. 101/38.1, 39, 40, 40.1; 250/559.08, 250/559.44, 559.46; 382/142; 356/240.1
See application file for complete search history.

(56) References Cited

U.S. PATENT DOCUMENTS

| | | | |
|---|---|---|---|
| 4,498,387 A | 2/1985 | Stirbis | |
| 4,741,266 A | 5/1988 | Stirbis et al. | |
| 4,773,326 A | 9/1988 | Hudec | |
| 4,932,320 A * | 6/1990 | Brunetti | B41F 13/12 101/181 |
| 5,120,126 A | 6/1992 | Wertz et al. | |
| 5,245,399 A | 9/1993 | Wertz et al. | |
| 5,374,988 A | 12/1994 | Wertz et al. | |
| 5,432,545 A | 7/1995 | Connolly | |
| 5,505,312 A | 4/1996 | Haring et al. | |
| 5,591,462 A | 1/1997 | Darling et al. | |
| 5,742,037 A * | 4/1998 | Scola | G06K 7/14 235/454 |
| 5,911,003 A | 6/1999 | Sones | |
| 5,941,109 A | 8/1999 | Johnson et al. | |
| 5,970,865 A | 10/1999 | Horth et al. | |
| 6,061,126 A | 5/2000 | Yoshimura et al. | |
| 6,227,643 B1 | 5/2001 | Purcell et al. | |
| 6,519,356 B1 * | 2/2003 | Hooker | G01N 21/9036 209/524 |
| 6,525,333 B1 * | 2/2003 | Hooker | G01N 21/909 250/223 B |
| 6,634,297 B2 | 10/2003 | Poetter et al. | |
| 6,948,425 B2 | 9/2005 | Dumenil | |
| 7,011,728 B2 | 3/2006 | Dewig et al. | |
| 7,043,326 B2 | 5/2006 | Neubauer et al. | |
| 7,209,575 B2 | 4/2007 | Spaeth | |
| 7,220,378 B2 | 5/2007 | Cochran et al. | |
| 7,227,166 B2 | 6/2007 | Cochran et al. | |
| 7,289,215 B2 | 10/2007 | Spady et al. | |
| 7,313,270 B2 | 12/2007 | Sones | |
| 7,394,937 B2 | 7/2008 | Sones | |
| 7,444,935 B2 | 11/2008 | Kruempelmann et al. | |
| 7,545,972 B2 * | 6/2009 | Itoh | G06K 9/00 382/142 |
| 7,633,614 B2 | 12/2009 | Haugholt et al. | |
| 7,667,836 B2 | 2/2010 | Sones et al. | |
| 7,684,034 B2 | 3/2010 | Sones et al. | |
| 7,773,214 B2 | 8/2010 | Sones et al. | |
| 7,787,111 B2 | 8/2010 | Kim et al. | |
| 7,839,498 B2 | 11/2010 | Mestha et al. | |
| RE42,715 E | 9/2011 | Sones | |
| 8,014,586 B2 | 9/2011 | Sones et al. | |
| 8,365,658 B2 | 2/2013 | Ouchi | |
| 9,046,356 B2 | 6/2015 | Adam et al. | |
| 9,132,664 B2 | 9/2015 | Schach | |
| 9,633,287 B2 | 4/2017 | Kawabata et al. | |
| 2001/0039889 A1 * | 11/2001 | Ackley | B41F 17/36 101/38.1 |
| 2003/0015105 A1 | 1/2003 | Dewig et al. | |
| 2003/0179920 A1 | 9/2003 | Hooker et al. | |
| 2005/0199151 A1 * | 9/2005 | Holten | B41F 33/0045 101/484 |
| 2007/0064229 A1 | 3/2007 | Norton et al. | |
| 2008/0292178 A1 | 11/2008 | Sones et al. | |
| 2012/0044540 A1 | 2/2012 | Dalal et al. | |
| 2013/0022250 A1 | 1/2013 | Nygaard et al. | |
| 2013/0087059 A1 * | 4/2013 | Baird | B41F 33/0027 101/416.1 |
| 2015/0283586 A1 | 10/2015 | Dante et al. | |
| 2017/0011246 A1 | 1/2017 | Blatt et al. | |
| 2017/0331976 A1 | 11/2017 | Bai et al. | |

FOREIGN PATENT DOCUMENTS

| | | | |
|---|---|---|---|
| CN | 101808825 A | 8/2010 | |
| DE | 20 2004 007 783 U1 | 10/2005 | |
| EP | 3 175 987 A1 | 6/2017 | |
| JP | 06174649 A * | 6/1994 | |
| JP | 06344541 A * | 12/1994 | |
| JP | H0771938 A | 3/1995 | |
| JP | H0943157 A | 2/1997 | |
| JP | 9267466 A | 10/1997 | |
| JP | 2000103039 A | 4/2000 | |
| JP | 2000180382 A | 6/2000 | |
| JP | 2002086690 A * | 3/2002 | |
| JP | 2002-514142 A | 5/2002 | |
| JP | 2002-355951 A | 12/2002 | |
| JP | 2004-529359 A | 9/2004 | |
| JP | 2005-531000 A | 10/2005 | |
| JP | 2006198919 A | 8/2006 | |
| JP | 2007144816 A | 6/2007 | |
| JP | 2007-521986 A | 8/2007 | |
| JP | 2008284790 A | 11/2008 | |
| JP | 2010214885 A | 9/2010 | |
| JP | 2010-249541 A | 11/2010 | |
| JP | 2010535112 A | 11/2010 | |
| JP | 2016-32879 A | 3/2016 | |
| WO | WO-9641299 A1 * | 12/1996 | ......... G01N 21/9036 |
| WO | WO 02/095382 A1 | 11/2002 | |
| WO | WO 2004/001285 A2 | 12/2003 | |
| WO | WO 2009/018893 A | 2/2009 | |
| WO | WO 2010/090315 A1 | 8/2010 | |
| WO | WO 2015/046119 A1 | 4/2015 | |

OTHER PUBLICATIONS

Supplementary European Search Report for EP 11 83 5099 dated Apr. 18, 2016.
Nello Zuech, "Machine Vision in Printing Industry Applications," AIA Vision Online, Global Association for Vision Information, 7 pages, 2007.
Generex Technlogy, Omniview, 4 Camera 360, 1 page, 2010.
"Tools for Color Measurement and Decoration Inspection for Canmakers," Applied Vision Corp., 1 page 2010.
Amir Novini, "White Paper: Colorimetric Technology for Can Makers," Applied Vision Corporation,. pp. 1-11, 2011.
Christine Connolly, "Industrial colour inspection case studies," the Colour Image Processing Handbook, Chapter 17, pp. 377-384, 1998.
Christine Connolly et al., "Colour measurement by video camera, " JSDC, vol. 111, pp. 373-375, Dec. 1995.
C. Connelly et al., "The use of video cameras for remote colour measurement," JSDC, vol. 112, pp. 40-43, Feb. 1996.
Roger A. Baker, Presentation at Asia CanTech Vietnam (Oct. 17-19, 2011), pp. 1-42 (dated Oct. 18, 2011).
Jonathan Ellaby, Presentation at Asia CanTech Vietnam (Oct. 17-19, 2011), "Wet-on-Wet Printing in 2-piece Metal Decorating," 14 pages.
"Container, Cupe & Tube Printers," Kase Equipment, Inc., http://www.kaseequip.com/sidewall_features.php?page=2, Copyright 2009 (2 pages including Japanese translation).

* cited by examiner

METHOD AND SYSTEM FOR DECORATOR COMPONENT IDENTIFICATION AND SELECTED ADJUSTMENT THEREOF

This application is based on and claims priority to U.S. Provisional Application No. 61/394,619, filed Oct. 19, 2010, which is incorporated herein by reference in its entirety.

BACKGROUND

Two-piece can manufacturing lines worldwide typically incorporate a print decorating machine which is often and simply known as a "decorator" to those in the industry. A decorator is a large machine which is capable of ink printing up to the entire cylindrical surface of the outside of a beverage can. Although decorators have been around for many decades and have grown steadily in speed during that time, the state-of-the-art examples of such decorators are able to run at speeds in excess of 3,000 decorated cans per minute (CPM). Because they need to be capable of functioning at these extremely elevated speeds, much of the functional aspect or subsystems of the machine employs rotary machine components. In fact, the main "printing wheel" on most decorators is rotary.

A rotary can decorator uses a process that is similar to the offset printing process for printing flat sheet materials. The difference is that the can decoration is printed onto a cylindrical metal object rather than flat paper. Because the surface on which the printing will occur is a curved outer surface of a cylinder, a mandrel which will provide support behind the printed surface is necessary. Many specialized skills are required to keep such a mechanically complicated machine properly adjusted. There are many different manufacturers of such print decorating machines, but they typically have a very simple and similar principle of operation. The major components of a decorator are: the inkers, the blanket wheel and offset printing blankets, the mandrel wheel, the over varnish unit, the mandrel-to-pin-chain transfer unit, and the pin chain transport system.

Decorators are well known in the can industry, but it is worth doing a brief overview of the functional concepts of a decorator to better understand the value and implementation of the present patent application. The functions of each of the major sections of a decorator are as follows.

Each label color has its own inker and an individual printing plate for that color. The purpose of the inker is to distribute the ink from a reservoir or a "fountain" (i.e., as in a "fountain pen") thru a series of metal and rubber rollers to even out the film thickness, and place a very uniform coating of ink onto the printing plate. The printing plate has a raised image of that color for that particular label.

The ink film that is on the raised image of the printing plate is transferred onto a polyester printing blanket that is attached to the curved surface of the blanket wheel. The printing blanket has an adhesive backing that allows it to stick to the surface of the curved blanket wheel. A six-color decorator, for example, has a blanket wheel with eight segments, each with its own printing blanket. Each inker printing plate transfers its image to each of these eight printing blankets as they pass by each individual inker. Each inker color is transferred to the printing blanket in perfect registration so that each color never touches the other colors.

A well-known six-color decorator has a mandrel wheel with 24 individual "mandrels". A mandrel is a steel or plastic tool that is precisely made to the particular inside diameter and length of the two-piece can that is being processed. The can inside diameter must be very close fitting to the outside diameter of the mandrel so that there is no more than 0.020" diametric clearance. There must be just enough clearance to allow the two-piece can to be drawn over the mandrel at a high speed by means of vacuum, but not too much clearance because the mandrel must support the can while the blanket wheel printing blanket transfers the ink from the printing blanket to the can. If there is too much clearance, the can will slip on the mandrel and "smear" the image as the ink is being transferred. The mandrel wheel circle typically conforms to the radius of the blanket wheel at the point where the ink transfer is taking place—this is so that the blanket wheel can "roll on" the image from the blanket to the cylindrical can. The blanket wheel image is exactly the same length as the circumference dimension of the can so there is no "overlap." The image is transferred in exactly one can revolution.

The wet ink image that is on the can is now given a clear coating of varnish over the wet ink, thus "over-varnish." This is accomplished without smearing the wet ink by matching the rotating surface speed of the can on the mandrel to the surface speed of a urethane over-varnish applicator roller. This process puts one complete revolution of coating onto the can. The coating is critical for not only protection of the can from transportation abrasion, but also provides the necessary gloss to the final can label.

The wet printed and over-varnished cans are removed from the mandrel and placed onto a transfer wheel suction cup that holds the two-piece can by its base or "dome." This is done by blowing a burst of compressed air into the can that forces the can off the mandrel and onto the transfer wheel suction cup that holds the can with vacuum. The transfer wheel is carefully timed to place the open end of the two-piece can over a metal pin on a continuous "pin chain," and then release the vacuum to complete this transfer.

The pin chain is a #60 roller chain that has metal pins every 5.25" continuously along its length. The purpose of the pin chain is to carry the wet can away from the decorator and pass the wet can through an oven that will provide enough heat to "cure" the wet exterior coating.

Can manufacturing is a very high speed manufacturing process and, as a result, if the process is not kept under precise control, scrap cans can be manufactured at extreme speeds. The decorating process is notorious for producing large quantities of improperly decorated cans which must either be sorted by hand or scrapped out completely. Most two-piece can plants have an adjoining warehouse which is full of improperly decorated cans which must be held for inspection. The industry knows those as "HFI's."

Slight misadjustments of the decorator machine can result in defects ranging from slight to catastrophic. The historical difficulty in the industry is having a good handle on how to identify and track misadjustments to a decorator machine. The extremely high speeds at which the cans are decorated make it difficult for a human to view the cans since they are continuously in high-speed motion. Although it varies a bit from machine to machine, the cans exit a state-of-the-art decorator on a pin chain which may be moving at between 20 and 25 feet per second. There may be some rotational consistency, but for the most part they are randomly rotationally oriented by the time they reach the pin chain, so viewing, decorating and troubleshooting are further compounded. As the cans are exiting the decorator, the ink is still in a wet and vulnerable state so the can cannot easily be removed for examination without a risk of smearing the uncured ink. In fact, the can will not be safe to handle until it has been through the curing oven. The round trip through the material handing and curing oven loop takes a substantial length of time. It is easy to understand how, at these speeds, many improperly decorated cans can be produced in a short period of time.

Many different kinds of both manual and automated inspection technologies have been developed and/or implemented. High-speed camera-based inspection systems of various types have been tried in the industry. Some of the systems snap a high speed image of the decorated can or print blanket, but the analysis of the image is left to human judgment as it is observed on a display screen. Heretofore, the different types of systems have failed to provide certain critical information that could be very valuable for troubleshooting the real source of decorator problems so that steps can be taken to correct them.

BRIEF DESCRIPTION

In one aspect of the presently described embodiments, a system comprises a mandrel wheel having a plurality of mandrels disposed thereon, each mandrel being operative to carry an individual cylindrical container around a periphery of the mandrel wheel, a print blanket wheel having a plurality of print blankets disposed thereon, the print blanket wheel being adjustable, each print blanket being operative to print a pattern on a peripheral surface of individual cylindrical container carried by a mandrel of the mandrel wheel, an inspection system operative to inspect the cylindrical container for faults or variations in the printed pattern on the individual cylindrical containers, the inspection system being operative to identify the individual mandrel which carried an individual cylindrical container and a corresponding print blanket that printed on the individual cylindrical container, and operative to generate fault or variation information, and a control system operative to receive the fault or variation information to facilitate correction of the system.

In another aspect of the presently described embodiments, the system further comprises motors or servo-systems for each mandrel to facilitate automated adjustment of the individual mandrels based on the fault or variation information.

In another aspect of the presently described embodiments, the system further comprises adjustable components for each mandrel and wherein adjustment of the individual mandrels is manual and based on the fault or variation information.

In another aspect of the presently described embodiments, the system further comprises motors or servo-systems for each print blanket wheel or individual print blankets to facilitate automated adjustment of the wheel based on the fault or variation information.

In another aspect of the presently described embodiments, adjustment of the print blanket wheel or individual print blankets is manual and based on the fault or variation information.

In another aspect of the presently described embodiments, adjustment to the individual mandrels, the print blanket wheel or individual print blankets comprises adjustment of pressure on the individual cylindrical containers during printing.

In another aspect of the presently described embodiments, the cylindrical containers are cans.

In another aspect of the presently described embodiments, the inspection system comprises an identification module to identify the individual mandrel, which carried an individual cylindrical container and a corresponding print blanket that printed on the individual cylindrical container, based on data from at least one of a part detection photo-detector, position one sensors, proximity detectors, counters and encoders.

In another aspect of the presently described embodiments, the inspection system is located where the pin chain is configured such that the long, circularly symmetrical axis of the can being imaged, is substantially out of parallel with at least one of the adjacent cans.

In another aspect of the presently described embodiments, the can being inspected is more than 5 degrees out of parallel with both of its immediately adjacent cans.

In another aspect of the presently described embodiments, the control system is operative to communicate the fault or variation information to an operator.

In another aspect of the presently described embodiments, the control system communicates some aspect of the fault or variation information graphically on a video display.

In another aspect of the presently described embodiments, the control system is a video inspection control system operative to communicate suggestions for corrective adjustment of the system to an operator based on the fault or variation information.

In another aspect of the presently described embodiments, the control system examines the cans on a realtime basis, while the decorator is actively decorating but employs algorithms to determine if any of the observed process variations are statistically significant before utilizing the inspection data to recommend a change to the process.

In another aspect of the presently described embodiments, the system further comprises a module operative to maintain a log of at least one of fault or variation information, warnings issued, statistical trending indications, time stamps for variations, suggestions for adjustment, verifications that suggestions were followed and automatic adjustments effected.

In another aspect of the presently described embodiments, the log is a secure log.

In another aspect of the presently described embodiments, a method comprises printing a pattern on a peripheral surface of individual cylindrical container carried by a mandrel of the mandrel wheel, inspecting the cylindrical containers for faults or variations in the printed pattern on the individual cylindrical containers, identifying the individual mandrel which carried an individual cylindrical container or a corresponding print blanket that printed on the individual cylindrical container, generating fault or variation information based on detected faults or variations and the identifying, and processing the fault or variation information to facilitate correction of the system.

In another aspect of the presently described embodiments, the cylindrical container is a metal can.

In another aspect of the presently described embodiments, the inspecting is executed in a realtime manner while the decorator is actively running and providing nearly immediate fault information.

In another aspect of the presently described embodiments, the decorator is printing the containers at a speed of in excess of 900 containers per minute.

In another aspect of the presently described embodiments, the processing comprises notifying an operator.

In another aspect of the presently described embodiments, the method further comprises manually correcting the system.

In another aspect of the presently described embodiments, the manual correction comprises adjusting the individual mandrel or the print blanket.

In another aspect of the presently described embodiments, the method further comprises automatically correcting the system.

In another aspect of the presently described embodiments, the automatic correction comprises adjusting the individual mandrel or the print blanket.

In another aspect of the presently described embodiments, a method comprises configuring a can decorator machine which is integrally connected to an automated vision inspection system to inspect each can at production speed soon after printing, printing a pattern on the peripheral surface of each individual can carried by a mandrel of the mandrel wheel by making rolling contact with a print blanket which is carried on a speed synchronized print blanket wheel, inspecting the can body for visual faults or variations in the printed pattern on each individual can body, identifying at least one of the individual mandrel, print blanket, colors, and other machine components which were in contact with each individual can in the decorator machine, generating and associating fault or variation information related to specific machine component adjustments that may be needed to further optimize or correct the decorating process, and sending electrical signals to a control system operative to automatically make the recommended adjustments to the specific machine components in need of adjustment;

In another aspect of the presently described embodiments, the additional step is taken of checking the decorated cans related to the change that was made to verify that the changes that were enacted did actually properly correct the process variation, if the enacted change did not correct the decoration, recommending further changes to optimize the decoration process further, and sending further electrical signals to the control system to automatically make the new recommended changes to further optimize the decoration.

DETAILED DESCRIPTION

The presently described embodiments relate to improvements (e.g. up to optimization) of a container printing or decorating operation. In one form, the printing and decoration operation is performed on-line in a high speed environment. Such high speed environments process containers at a variety of rates, but rates of 800-2200 containers per minute (CPM) are not uncommon. In one form of the presently described embodiments, the decorator prints on containers at a rate of greater than 900 containers per minute. In these environments, the presently described embodiments may inspect each and every container or only selected containers (e.g. 1 in every 6 containers) depending on the configuration of the inspection system. This type of decorating operation is integral and important to virtually all two-piece beer and beverage can manufacturing facilities worldwide. The beautiful and stylish decorating that adorns the outside of metal cans such as an average beer or carbonated soft drink can is an example of the type of print decorating that would benefit from the subject embodiments. Many other kinds of cylindrical containers including certain other types of cans, could potentially also benefit from the subject embodiments.

The presently described embodiments relate to an automated inspection technology which is augmented with novel concepts and methodologies for making such critical process and machine information properly available. The inspection system (which, in at least one form, is a visual inspection system) contemplated can inspect for a variety of faults or variations in the printed pattern including color, voids, smears, lightness, darkness, missing colors, blurriness, readability, clarity, color specifications, clarity in code (such as, e.g., UPC codes), . . . etc. The faults or variations are also correlated to the specific portion of the system (e.g. mandrel, print blanket, . . . etc.) that printed the pattern. With the availability of the new fault or variation information according to the presently described embodiments, a decorator operator will be made directly aware of the specific portions or subsystems of the decorator machine which are not functioning properly. The new information will directly facilitate, and can even recommend, the adjustments that are necessary to the decorator to correct its printing functions. In some cases, faults or variations may result from damaged parts (e.g. print blankets, mandrels, . . . etc.) that can then be replaced. It is possible to use this new information to optimize the operation of the decorator in a number of important ways. It is also possible, in some embodiments, to use this information by way of a properly configured control system and, after specific augmentation capabilities are added to the decorator machine, to automatically close the loops with specific parts or subsystems of the decorator to dramatically improve the decorating process.

For example, in order to properly adjust and optimize a decorator machine, it is necessary to know specific aspects about the quality of the printing as it corresponds to each printing blanket. The general and averaged printing results of the decorator are simply inadequate to properly optimize the decorator's capability. Each of the printing blankets, for example, will demonstrate its own process capability and process variations and should be understood before machine changes can be properly performed. Currently, lacking the detailed information about the performance of various machine subsections or components, gross or global adjustments are typically performed which do not fully optimize the decorating process. A sub-optimized decorating process will have substantially larger mean, standard deviation, and CPk indexes associated with many of the critical variances in the decorating. As the decorating machine's bearings, mandrels, cams and other components wear over time, the statistical characterization corresponding to individual printing blankets will widen.

Continuing the example, in order to fully optimize the decorator, the individual machine structure responsible for holding each print blanket should have its positional or printing contact pressure adjustment changed. Lacking the correct information regarding the performance of each of the blankets results in avoiding making changes to the individual blanket in favor of resorting to making only a global adjustment. Changing the global adjustments, however, will actually take one or some of the blankets in the wrong direction statistically while taking others in the right direction. Blindly making a global adjustment is often just as likely to cause as much damage to the process integrity as positive change. To be more specific, and in a blanket print wheel, it may be that only one of the print blankets needs to be adjusted to correct the problem, but they all get moved by way of the global central adjustment. If a specific print blanket needs more contact pressure, the global adjustment may accomplish that at the penalty of making the contact pressure too high for all the other seven blankets. While this might not push the other seven blanket printing results out of an acceptable range, it would certainly sub optimize the overall output of the decorator.

It is also possible to attach indicators or markings to each can blanket or container that will be read by a concurrent trigger inspection system to know by which print blanket and corresponding machine component a particular can was decorated. These indicators or markings could either be printed with ink that is readable in the visual spectrum or with ink which can fluoresce under UV or IR spectra for reading by a machine vision system or detection with a sensor. Thus, with either visible or invisible indicators or markings it would be possible to attach something to identify by which print blanket and machine component a particular can was decorated.

Alternatively, it is sometimes more practical to keep track of a variety of machine parts as a sequence, and thus be able to track and correlate back to the relevant or responsible machine component for certain types of process problems. To do this, photo-detectors such as part detection photo detectors, photo-cells, proximity detectors, position one sensors, encoders other types of sensors and counters, and/or the like can be employed in suitable locations and configurations to indicate starting components in a rotary or linear sequential sequence.

As another example, if the automated inspection technology is characterizing the color in L*a*b*color space by monitoring the deltaE, it is far more valuable to be able to trace the color variation back to which print blanket or perhaps which inker is at fault. The present invention envisions not only identifying that the deltaE is out of specification, but also to be able to track the color trending to specific machine parts, components, and machine subsystems. The automated inspection technology with this added integration of tracking does become more usable as a true process optimization and process monitoring tool which has a far greater value to the can manufacturing plant.

The envisioned system could display the new information in various graphical ways so that it is easily understood by a minimally trained operator. The system could actually display on its user interface specific, detailed graphics or pictorial detailing indicative of the decorator's configuration. It could show in great detail exactly where the recommended adjustment is located with a close-up view of a facsimile thereof. It could recommend the extent of the adjustment based on the numerical, spatial, or other correlated information available to the system. It can also log the information and indicate who the operator was at the time of the recommended changes, and the operator could confirm the extent to which the recommended changes were made or not. The system could further detail the results of the change both globally and specific to the machine components or subsystems that were changed. It could be programmed to monitor the results of those changes more visibly to the operator or with specially set criteria until told that all was well.

The system could also communicate the changes to a higher level or plant wide monitoring system complete with recommendations as to any changes in maintenance schedules that should be noted as a result of the sequence of events. The system could interactively ask the operator if there are any further steps that should be taken or preventive maintenance steps or notes that should be logged. The system also could keep a special watch for the recurrence of certain types of problems in the decoration which might indicate worn, loose, or out-of-spec components which are in need of attention in the decorator machine.

An even more sophisticated version of the envisioned embodiments would further automate the results of the inspection and process monitoring. Many of the machine components which could require adjustment could be powered or could be driven by various types of servomotors which would be capable of making adjustments without stopping the machine or even without human intervention. Such adjustments could actually be arranged such that they could make the adjustments while the machinery is still running for adjustments that might require stopping the machine for a human to make those adjustments. If the inspection system can gather and analyze the statistical information on the decorator process as to individual machine components, machine parts, and subsystems, then it is possible to automate the proper use of that information by way of this invention to optimize the decorator process. New machines could be built from scratch, which have remotely controllable motorized adjustments, or it is possible to rebuild and refurbish older decorators to incorporate the desired powered adjustments.

By monitoring the specific quality of results for each can as a function of what machine components touched that can, it can be seen that the can decoration process can be substantially optimized beyond what is possible with currently available technologies. It is also recognized that, while examples have been given herein, one of skill in the art in designing, implementing, or operating decorators could use these concepts and extend the concepts taught here in many ways to great advantage for the can or cylindrical product decoration world.

Figure 1:
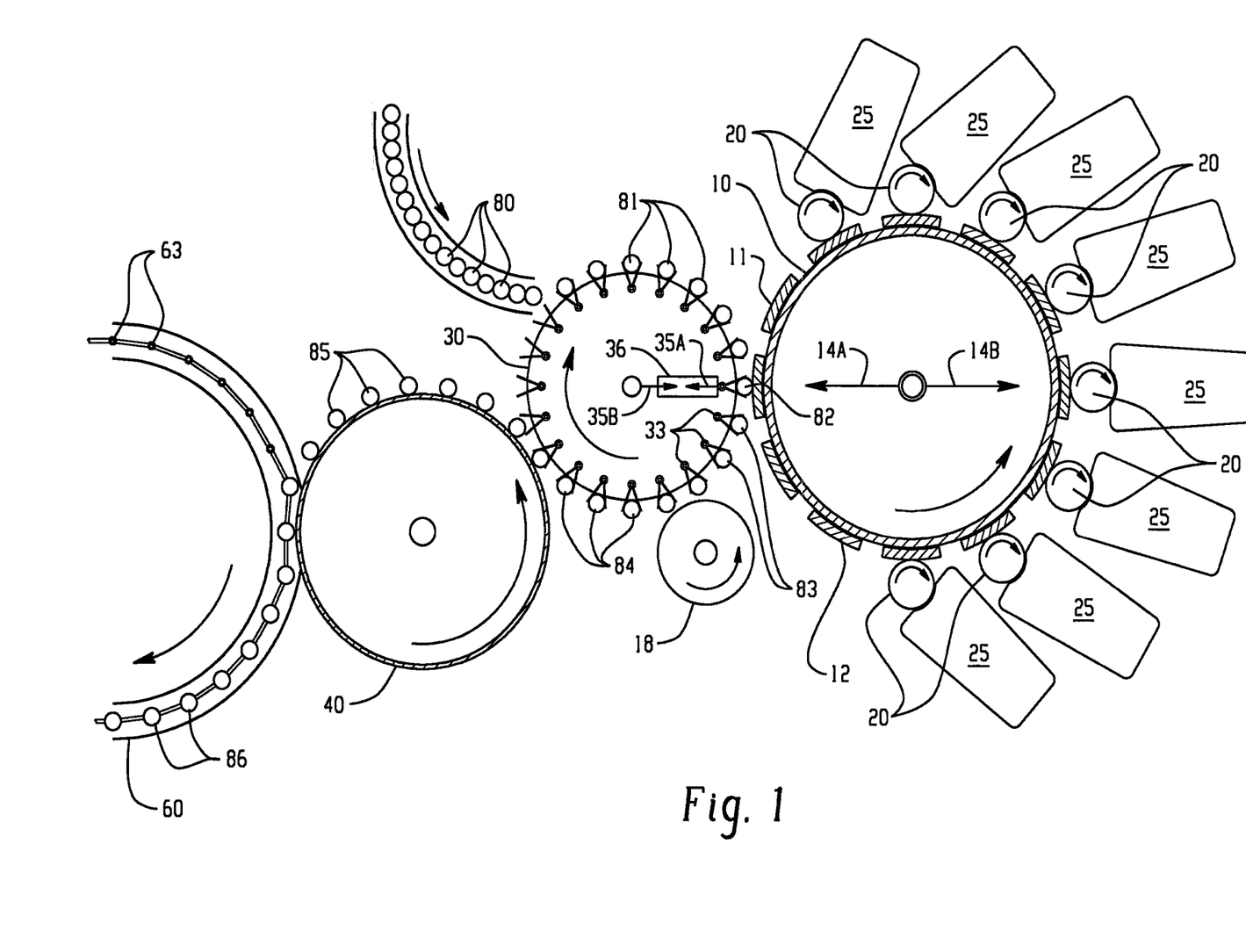
FIG. 1 is a representative illustration of a system according to the presently described embodiments.
Figure 2:
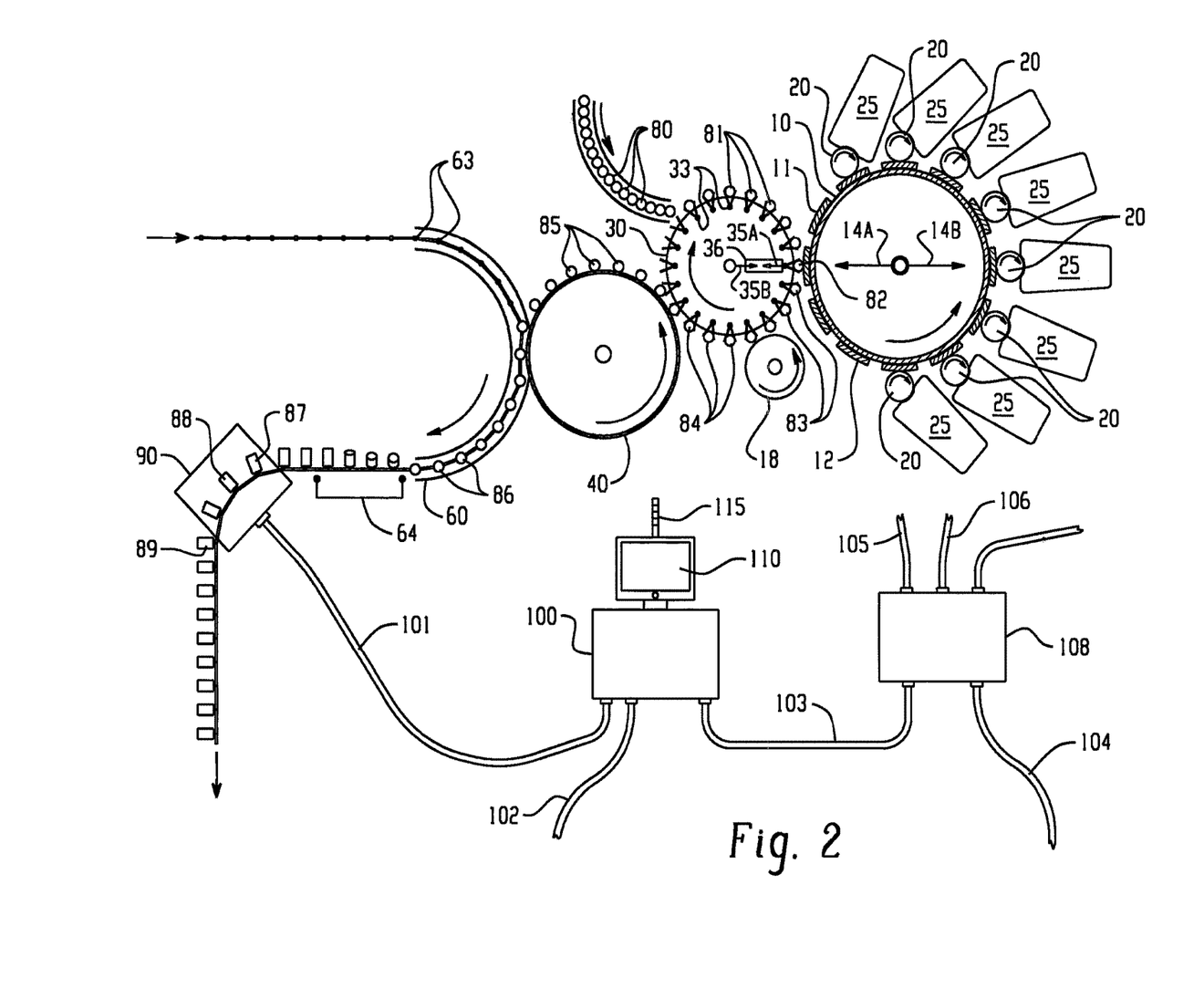
FIG. 2 is a representative illustration of a system according to the presently described embodiments.

As an example, FIG. 1 represents a skeleton functional diagram of the side view of an exemplary 8-color can decorator. In this example, the main print blanket wheel (10) rotates (in this view) in a counter-clockwise direction as indicated by the arrow. The print blankets (12) which are typically formed of a polyester material with an adhesive back, are adhered to the periphery of the print blanket wheel (10). As the wheel (10) rotates, each respective print blanket (12) has ink applied to it by the raised 3D printing plate which is attached to the inker wheel (20) while the inker reservoir (25), corresponding to each respective inker wheel (20), functions to smooth on an even coating of ink to the respective individual printing plates mounted on inker wheel (20). FIG. 1 shows eight different inkers (25) which are used to apply the respective colors of ink which are to be printed on to the cylindrical containers or cans (81). As the final inked printing plate (11) approaches the spinning mandrels, it is ready to print the outer peripheral surface of the container or can. The mandrels on the periphery of the mandrel wheel (30) are spinning the cans (81) such that their peripheral angular velocity exactly matches the angular velocity of the printing plate (11).

Since their speeds are matched, there is zero relative velocity when the printing plate (11) begins to put pressure on the can to be printed (82) which achieves the ink transfer to the can's peripheral surface. A properly set-up decorator will deflect or compress the print blanket polyester body by between about 0.007 inches and 0.010 inches. Depending on the brand of machine and the machine design, this pressure is adjusted in different ways. Conceptually, however, the unit which comprises the main print wheel (10) and all the inkers (20-25) are moved in unison in direction 14A for greater penetration and pressure or in direction 14B for less penetration and pressure. The adjustment is always some form of mechanical adjustment to affect a positional movement ultimately of the blanket wheel (10). Because this one single adjustment adjusts the working position of all of the print blankets, it is known as a global or whole machine adjustment. Many of the widely used machines do not have any individual adjustment either for the mandrels' position (35B or 35A) or the print blanket position.

These individual adjustments could be very desirable to tweak or optimize the performance of any given print blanket relative to, and separately from, any of the others. As an exception, one popular machine has each mandrel mounted on its own eccentric such that it will rotate out of the way to release a dangerous jam situation in the event of an emergency. The setup for such a machine typically requires the use of a dial indicator to re-zero each station so they are all positioned to penetrate the print blanket by the same amount. By default, they could be individually manually adjusted if there were feedback to indicate which direction and how much adjustment would be required. They certainly cannot be adjusted while the machine is in motion.

As the printed cans (83) continue to rotate around on their respective mandrel on the mandrel wheel (30), they come into matched peripheral speed contact with the over varnish wheel (18). After varnishing, the completely varnished and printed cans (84) continue along the rotary path on the mandrel wheel (30) until they are passed to the pin chain transfer wheel (40). The cans (85) on the pin chain transfer wheel (40) are each mated with a pin on the pin chain (63) to be carried away on the pin chain conveyance system (60) for curing in the pin chain oven which is not show on FIG. 1.

According to the present invention, thorough analysis of the images of the printed cans will allow building a database which correlates to each individual print blanket and specific aspects as to that print blanket's process variation, drift, anomalies, color accuracy and all types of defects. When statistically significant amounts of information have been verified by subsequent inspections, one of multiple things can happen. Human intervention can recommend a particular machine adjustment or course of action to correct the problem and the system can learn what those corrections are over time so the inspection system will know how to make similar corrections in the future. Alternatively, the expert inspection system can be taught by a human operator how to respond and make corrections or adjustments under a variety of circumstances and fault types. The expert inspection system (which, in at least one form, is a visual inspection system) will have kept track of every can and every machine component so that it knows which machine components acted or were related to a particular can so it knows which print blanket (12) and which inker (20-25) and which mandrel 33 were responsible for the production of each corresponding can. The present embodiments would use suitably configured and positioned encoders, position-one sensors, photo-detectors such as part detection photo detectors, photo cells, proximity sensors, other types of sensors and counters, and/or the like in order to track all the related information from the respective cans and machine components.

In this regard, in one form, after the can has been decorated and it proceeds to exit the can decorator machine on the pin chain conveyor (63), it follows the path (60) and then proceeds through the region (64) of the pin chain conveyor path. Region (64) indicates twist section in the pin chain conveyor which may or may not exist on any application. It is shown conceptually to twist the can conveyance attitude so that the can (87) passes around the outer periphery of a curve so that the can (87) and the can (88) further along the curve are no longer parallel to one another. As the cans proceed through the inspection tunnel (90), the cameras from the vision inspection system are taking pictures of the periphery of the can from at least one direction. It is more likely that there are at least three, perhaps four, cameras in the inspection tunnel (90) imaging the complete circumference of the periphery of the can. The cameras must be equipped with the appropriate optics to image the cylindrical containers' decoration with sufficient resolution to inspect the decoration for a wide variety of different kinds of variations from normalcy. The proper illumination must also be designed and implemented so that the image is substantially evenly illuminated to allow good color definition and contrast without specular glare back to the lens. Therefore, a soft and even illumination from slightly above the camera's center line is desirable.

As the images are taken of the decoration of the can (88), it is not essential but is very useful that the can behind it (87) and the can preceding it are not parallel to the can body (88). That is, the inspection system is located where the pin chain is configured such that the long, circularly symmetrical axis of the can being imaged, is substantially out of parallel with at least one of the adjacent cans. And, in one form, the can being inspected is more than 5 degrees out of parallel with both of its immediately adjacent cans. This out-of-parallel condition can provide a marked improvement in the quality of the imaging because specular reflections will not result from the neighboring cans. An alternative imaging arrangement can incorporate a single high resolution camera which is located on axis with the long axis of the can and then employs an engineered configuration of mirrors or a pseudo-conical mirror in order to preferably image 360 degrees around the can's periphery. This type of image will produce a spatially distorted single image which should ideally undergo spatial image correction in order to yield the highest quality inspection. If multiple cameras are used around the periphery to image the can, there must also undergo some form of reassembly and spatial manipulation in order to have the highest quality image for inspection. Since, in any case, a substantial algorithmic manipulation and evaluation must occur, the production of the highest quality image is very important. Thus, the out-of-parallel-condition shown between cans (88) and (87) during the image snapping process, can make a substantial improvement in the quality of the automated vision inspection of the can decoration.

The cameras that were mentioned which are housed in the inspection tunnel (90), and are imaging the can (88), can in one form send their images through cabling (101) back to a machine vision and computer console housed in housing (100). The machine vision processing infrastructure housed in (100) would be operatively powered by 120-volt or 220-volt single phase power shown schematically as wire cable (102). The computer processor contained in housing (100) would be operatively connected to a touch-screen video display screen (110) could provide the user interface for setup and adjustment and for querying information as to the results of the automated video inspection of the stream of cans (86). The video screen would also allow for the whole range of display of the video images, statistics, process trending, and recommended steps for optimizing the can decorating process.

The computer vision inspection system (100) will be aware of the timing and location of each can flowing through the decorating process from the moment the cans (80) enter the mandrel wheel (30) including which mandrel has been associated with each can. This may be accomplished using the aforementioned encoders, cells, counters, sensors, detectors and the like. Its software will track each of the cans (81) through the entire decorating process and will also know which print blanket (11) of the print blankets which surround the print blanket wheel (10) has been associated with each can. If indeed a variation has been discovered from the vision inspection for a particular can, as has been discussed herein, a recommendation may be made to either move the print blanket wheel (11) in the direction (14A) for greater printing pressure or in the direction (14B) for less printing pressure. In the event that the decorating machine has been manufactured with individual mandrel (33) adjustments, such as directions (35A) and (35B), then the information as to increasing or decreasing the print blanket pressure could be made for the particular mandrel that corresponded to the variation. In this regard, in one form, the inspecting is executed in a realtime manner while the decorator is actively running and providing nearly immediate fault information. In addition, in one form, the control system examines the cans on a realtime basis, while the decorator is actively decorating, but employs algorithms to determine if any of the observed process variations are statistically significant before utilizing the inspection data to recommend a change to the process.

There could be a 1:1 or 2:1 or 3:1 or 4:1 relationship between the number of mandrels and the number of print blankets installed in a given machine. Regardless of what the ratio is, the machine vision inspection computer (100) will know which mandrel and which print blanket were associated with a particular inspected can (89). The machine vision computer (100) can, in the simplest form, simply display the resulting information on the video monitor (110) for the human operator knowledge and further utilization to make the adjustments. The human adjustments may either be made manually for example by adjusting a lead screw or an eccentric can follower, or he may have a motorized means available to him whereby individual mandrels have a motorized adjustment through which the human operator can affect the change. An example and merely representative optional adjustment element 36 (FIG. 1), which could be manual or automated or motorized or servo-ed, is shown. Such an element could also or alternatively be provided to the print blankets and/or inker stations or other system elements if desired. Only a single element 36 is shown for ease of reference—it should be understood that adjustment elements could, and in at least one form would, be provided to all individual mandrels or other elements. Of course, there may also be some systems where an adjustment element serves multiple mandrels (or print blankets or inker stations, . . . etc.). The more sophisticated system of the future will send an electronic signal from the machine vision and automation process monitoring system (100) through the cable (103) to the decorator control system (108) which will operatively be connected to some form of stepper motor or servo motor control which corresponds either to the global adjustment of the blanket wheel (10) in directions (14A) or (14B), which electrical signal could travel through cable (106) to affect the change. Alternatively, if the decorator machine is equipped with servo controlled individual mandrels, the decorator control system (108) could send the signal through cable (105) to affect a stepper motor or servo control (e.g. at 36) of the appropriate independent mandrel (33) in direction either (35A) or (35B).

In the event that the inspection shows a problem with the over-varnish, an appropriate electrical signal could be sent to affect a change in a stepper motor or servo control of the over-varnish wheel (18) changing the pressure which it exerts on the cans which are spinning on their respective mandrels (33). Similar corrected could be affected for individual colors which are coming from the inker fountains (25) and the inker wheels (20) which would be visually recognized because of its characteristic color. It is possible to digitally control the inker fountains (25) or the pressure that the inker wheel (20) exerts upon the print blanket (12) in order to impart the correct amount of ink. Although most of the adjustments on decorators are not historically stepper motor or servo motor controlled, it is very possible to design the machine or retro-fit the machine with such capability. Since the vision system would be capable of recognizing the uniformity of the color application and the uniformity of the decoration printing, it could algorithmically derive an out of squareness or unevenness of pressure which may be causing such variation. By equipping the decorator with adequate servoed adjustments and by designing the machine vision inspection algorithms to correctly discern the variations, it is possible to completely close the loop as has been described for a fully automatically optimized decoration process.

Also, in one form, the system is provided with a module operative to maintain a log (e.g. a secure log) of at least one of fault or variation information, warnings issued, statistical trending indications, time stamps for variations, suggestions for adjustment, verifications that suggestions were followed and automatic adjustments effected. The log may be maintained at any suitable location in the system and may be integral with or separate from the above noted database used to correlate information.

Figure 3A:
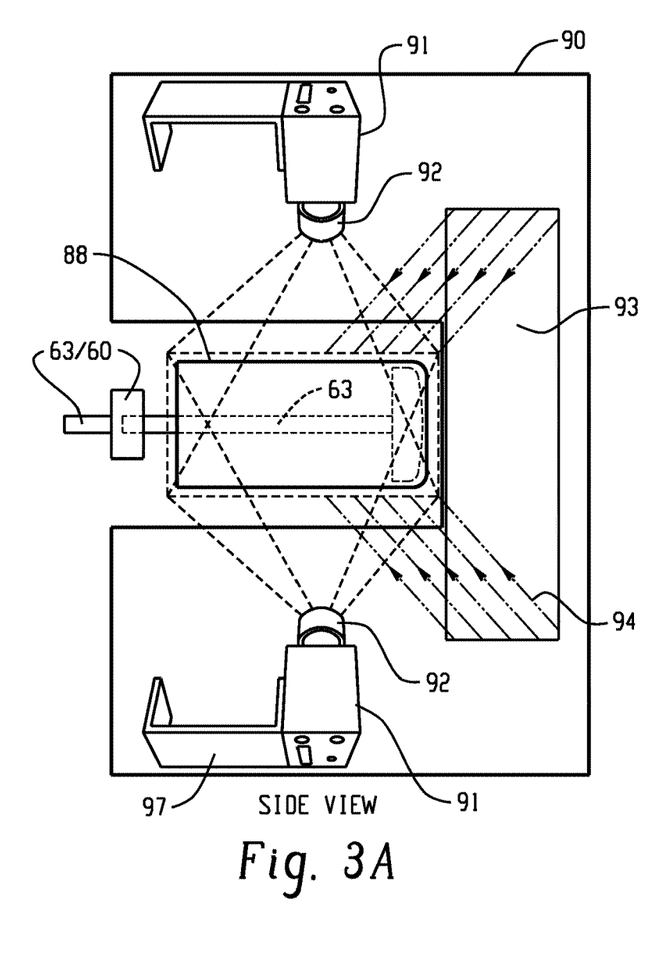
FIGS. 3A and 3B are representative illustrations of a system according to the presently described embodiments.
Figure 3B:
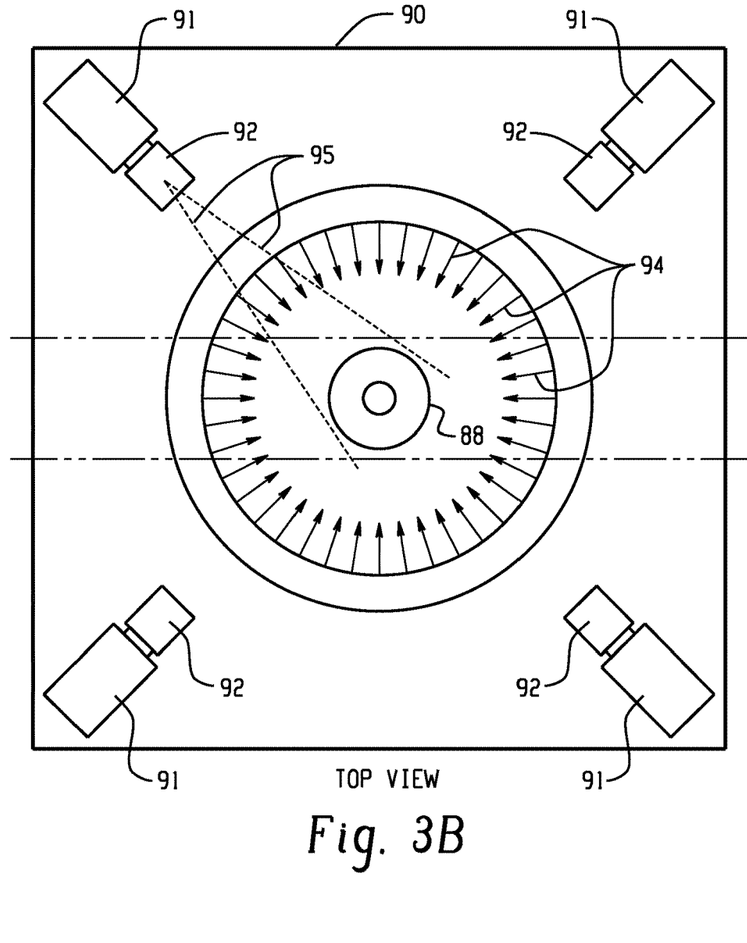

FIGS. 3A and 3B show a top view and a side view of the inspection tunnel (90). The top view shows four cameras (91) with their respective lenses (92) aimed at the can (88) shown in the center. The cameras are able to image the can because it is being illuminated by the light rays (94) which are emanating from a circularly symmetrical lighting module (93) which is mounted just above the can to prevent specular reflections. The camera's field of view (95) is adjusted in combination with the lens (92) and the location of the camera (91) to fill the imager as full as possible with decorated can image. The light source (93) in the most ideal embodiment is strobed at the exact right moment when the can is in the center of the four respective cameras.

The side view shows the pin chain conveyor (63/60) holding the can (88) on the carrier pin (63) as it proceeds on, ideally, its circular path through the inspection tunnel (90). The cameras are mounted on brackets (97) which hold them solidly and rigidly on an engineered infrastructure so that they are imagining the cans consistently. The power supply for the cameras (91) and the illumination strobe (94) and the control therefor could either be mounted in the enclosure (90) or could be mounted in the enclosure (100) and cabled through the umbilical wireway (101). Although it is possible to do processing in the cameras themselves, it is more likely because the images need to be stitched together in some form, that the image information will be transmitted through the umbilical wireway (101) to the central vision computer in the enclosure (100) for further processing. The system (100) can also be operatively connected to a plant monitoring network or any other communications network either directly or through the umbilical cable wireway (101) and then ultimately through the cable wireway (104). The simplest of interfaces is also shown as a multi-colored beacon (115) which would illuminate flash different color indicator lights to indicate the status of the decorating process. The operator would be able to program the system to illuminate these lights in accordance with whatever notifications are deemed to be valuable to the decorator operator. An audible horn could also be incorporated but for simplicity has not been shown in the diagrams.

Although some specific implementations have been shown and described herein, they are shown for purposes of illustrating concepts and capability. It should be understood that one of skill in the art of decorator operation and machine vision technology could utilize these concepts in many different ways to optimize the decorating process.

Also, the actual automated video inspection could take place inside the decorator looking at the spinning mandrels (84) on the mandrel wheel (30) or inspecting the cans in roughly positions where the cans (85) are indicated on the pin chain stripper wheel (40), but inspecting inside the decorator is a very hostile, contaminated environment. As long as the cans on the pin chain are tracked properly, the automated machine vision station could be safely away from the decorator to prevent ink contamination problems. The important thing is being able to keep continuous track of the cans to be able to relate them back to their respective print blankets and machine components.

As noted, the global adjustment of the print blanket wheel (10), as discussed various other places in this document, could be motorized or servoed in directions 14A and 14B so that the global process optimization can be affected while the decorator is rotating and printing. Similarly, but more importantly, to more fully optimize the printing process, the individual mandrels (33) can be motorized or servo adjusted in directions 35B or 35A in strict accordance with the statistical results of the automated machine vision inspection when statistically significant process changes have been verified with a sufficient number of inspections which correspond to the mandrels' (33) position 35B-35A. Alternatively, the mandrels may be provided with suitable hardware for manual adjustment.

Similarly, as alluded to above, the printing plate wheels (20) or the print blankets (12) could have their movements manually adjusted, motorized, or servo controlled so that individual colors could be optimized through the results derived from the automated vision inspection as well. Also, the inker stations could be provided with manual or automated adjustment features. Not only could the hue saturation and intensity of the color be verified but it is also possible to verify the consistency of the color across the height of the can. The color can be executed and calibrated to Lab or other standards for measuring or specifying color. With this information it would be possible to close the loop and automatically adjust the ink distribution across the width of the inker roll.

By using the information that would be available to the automated video inspection system, it would be possible to automate these and many other aspects of the printing and decorating process on cans and other cylindrically shaped products. These teachings should give one of skill in the art sufficient concepts and ideas as to how to fully automate or optimize the printing of cans and cylindrical components.

Figure 4:
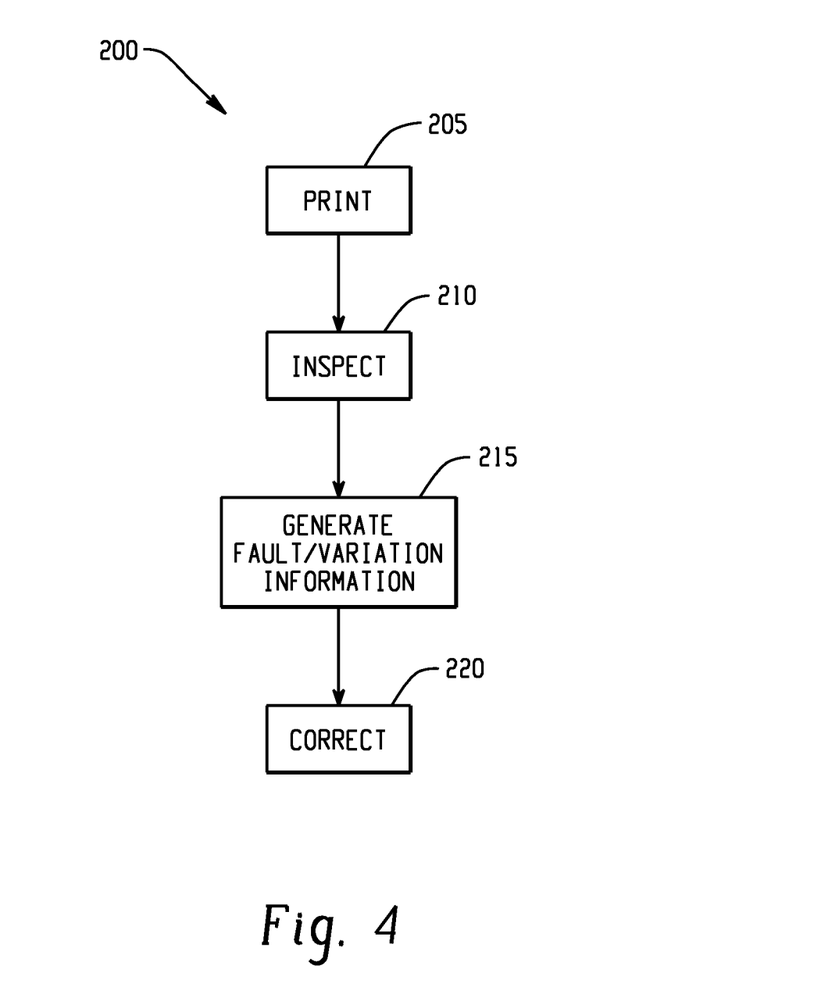
FIG. 4 is a flowchart of a method according to the presently described embodiments.

With reference to FIG. 4, a method 200 according to the presently described embodiments is illustrated. In this regard, the method 200 includes printing patterns on the peripheral surface of cylindrical containers (at 205). Next, the printed patterns are inspected for faults or variations (at 210). Fault or variation information is gathered (at 215). It should be appreciated that, in one form, the fault or variation information is correlated to a specific mandrel that carried the container and/or a specific print blanket that printed the pattern on the object. Of course, the fault information may take a variety of forms. Other components, such as the inker station, may also be identified. Further, there may be some applications where the fault or variation information only includes either the mandrel information or the print blanket information. In any event, the fault or variation information is then used by the system to notify the operator to facilitate and/or make corrections to the process (at 220). This notification may include identification of the problem, and also may include suggestions for correction. As noted above, this data could be based on, in part, a log or other intelligent features of the system. In at least one form, the fault information is fed back to a system controller that facilitates adjusting the pressure for a mandrel and/or print blanket. The adjustment could be automatic, or the adjustment could be manual (e.g. triggered by a notification from the controller to a human operator). In this regard, the adjustment of the pressure applied during printing could be accomplished in a variety of ways. The individual mandrel could be automatically or manually adjusted. The print blanket wheel could be globally adjusted. Or, in some embodiments, each print blanket could be individually adjusted. In still further embodiments, other portions of the system (e.g. inker stations) may also be adjusted. In some environments, other process conditions (e.g. temperature differences) may also be monitored and adjusted based on the detected fault or variation information.

Further, in one form, according to the presently described embodiments, a method for controlling and optimizing the printing of patterns on peripheral surfaces of cylindrical can bodies comprises configuring a can decorator machine which is integrally connected to an automated vision inspection system to inspect each can at production speed soon after printing. A pattern is printed on the peripheral surface of each individual can carried by a mandrel of the mandrel wheel by making rolling contact with a print blanket which is carried on a speed synchronized print blanket wheel. The method further includes inspecting the can body for visual faults or variations in the printed pattern on each individual can body, identifying at least one of the individual mandrel, print blanket, colors, and other machine components which were in contact with each individual can in the decorator machine, generating and associating fault or variation information related to specific machine component adjustments that may be needed to further optimize or correct the decorating process, and sending electrical signals to a control system operative to automatically make the recommended adjustments to the specific machine components in need of adjustment. The method also includes the additional step of checking the decorated cans related to the change that was made to verify that the changes that were enacted did actually properly correct the process variation. If the enacted change did not correct the decoration, further changes are recommended to optimize the decoration process further. Further electrical signals are sent to the control system to automatically make the new recommended changes to further optimize the decoration.

It should be appreciated that the various features of the presently described systems and methods may be implemented using a variety of hardware configurations and software techniques. For example, the methods for inspecting or controlling, generating fault or variation information, adjusting automatically the various portions of the system may be implemented in the system components described and controlled through routines executed on suitable processors and/or controllers (such as the controller for the decorator, the controller for the inspection system, and the like).

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system for printing patterns on peripheral surfaces of cylindrical containers comprising:
 a mandrel wheel having a plurality of mandrels disposed thereon, each mandrel being operative to carry an individual cylindrical container around a periphery of the mandrel wheel;
 a print blanket wheel having a plurality of print blankets disposed thereon, the print blanket wheel being adjustable, each print blanket being operative to print a pattern on a peripheral surface of the individual cylindrical container carried by one of the mandrels of the mandrel wheel, the printing of containers occurring at production speed in excess of 900 containers per minute;
 a camera-based imaging inspection system comprising multiple cameras positioned around a periphery of the individual container being imaged and a circularly symmetrical lighting module mounted to be above the individual container being imaged to prevent specular reflections to obtain images of the complete circumference of the peripheral surface of the individual container and being operative to inspect the images for faults or variations in the printed pattern on the individual cylindrical container, the inspection system being operative to identify the individual mandrel which carried an individual cylindrical container and a corresponding print blanket that printed on the individual cylindrical container, and operative to generate fault or variation information;
 a control system operative to receive the fault or variation information to facilitate correction of the system, wherein the control system is operative to provide suggestions for corrective adjustment of the system based on the fault or variation information, wherein the corrective adjustments are correlated to the individual mandrel, the corresponding print blanket, or the print blanket wheel; and,
 a storage module or database configured to maintain correlation information which correlates information on process variation, drift, anomalies, color accuracy and the fault or variation information to each individual print blanket and a log of at least one of fault or variation information, warnings issued, statistical trending indications, time stamps for variations, suggestions for adjustment, verifications that suggestions were followed and automatic adjustments effected.

2. The system as set forth in claim 1 further comprising motors or servo-systems for each mandrel to facilitate automated adjustment of the individual mandrels based on the fault or variation information.

3. The system as set forth in claim 1 further comprising adjustable components for each mandrel and wherein adjustment of the individual mandrels is manual and based on the fault or variation information.

4. The system as set forth in claim 1 further comprising motors or servo-systems for each print blanket wheel or individual print blankets to facilitate automated adjustment of the wheel based on the fault or variation information.

5. The system as set forth in claim 1 wherein adjustment of the print blanket wheel or individual print blankets is manual and based on the fault or variation information.

6. The system as set forth in claim 1 wherein adjustment to the individual mandrels, the print blanket wheel or individual print blankets comprises adjustment of pressure on the individual cylindrical containers during printing.

7. The system as set forth in claim 1 wherein the cylindrical containers are cans.

8. The system as set forth in claim 1 wherein the inspection system comprises an identification module to identify the individual mandrel, which carried an individual cylindrical container and a corresponding print blanket that printed on the individual cylindrical container, based on data from at least one of a part detection photo-detector, position one sensors, proximity detectors, counters and encoders.

9. The system as set forth in claim 1 wherein the inspection system is located where a pin chain is configured such that the long, circularly symmetrical axis of the individual container being imaged, is substantially out of parallel with at least one of the adjacent cans.

10. The system as set forth in claim 9 wherein the individual container being imaged is more than 5 degrees out of parallel with both of its immediately adjacent cans.

11. The system as set forth in claim 1 wherein the control system is operative to communicate the fault or variation information to an operator.

12. The system as set forth in claim 11 wherein the control system communicates some aspect of the fault or variation information graphically on a video display.

13. The system as set forth in claim 1 wherein the control system is a video inspection control system operative to communicate suggestions for corrective adjustment of the system to an operator based on the fault or variation information.

14. The system as set forth in claim 1 wherein the control system examines the cans on a realtime basis, while the system is actively decorating but employs algorithms to determine if any observed process variations are statistically significant before utilizing inspection data to recommend a change to the process.

15. The system as set forth in claim 1 wherein the log is a secure log.

16. The system as set forth in claim 1 wherein the images of the complete circumference of the peripheral surface of the individual container are at least one of color images, stitched images, and reassembled images.

17. The system as set forth in claim 1 wherein each container is imaged and the correlation information correlates each container to a mandrel or print blanket.

18. A method for controlling printing patterns on peripheral surfaces of cylindrical containers comprising:
 printing a pattern on a peripheral surface of individual cylindrical containers carried by mandrels of a mandrel wheel, the printing of containers occurring at production speed in excess of 900 containers per minute;
 using a camera-based imaging inspection system comprising multiple cameras positioned around a periphery of an individual cylindrical container being imaged and a circularly symmetrical lighting module mounted to be above the individual container being imaged to prevent specular reflections to obtain images of the complete circumference of the peripheral surface of the individual container, inspecting the images for faults or variations in a printed pattern on the individual cylindrical container;

identifying, by the inspection system, an individual mandrel which carried an individual cylindrical container or a corresponding print blanket that printed on the individual cylindrical container;

generating fault or variation information, by the inspection system, based on detected faults or variations and the identifying;

processing the fault or variation information, by a control system, to facilitate correction of the system, wherein the control system is operative to provide suggestions for corrective adjustment of the printing based on the fault or variation information, wherein the corrective adjustments are correlated to the individual mandrel or the corresponding print blanket; and, maintaining in at least one database or module correlation information which correlates information on process variation, drift, anomalies, color accuracy and the fault or variation information to each individual print blanket and a log of at least one of fault or variation information, warnings issued, statistical trending indications, time stamps for variations, suggestions for adjustment, verifications that suggestions were followed and automatic adjustments effected.

19. The method as set forth in claim 18 wherein the cylindrical container is a metal can.

20. The method as set forth in claim 19 wherein the inspecting is executed in a realtime manner while the system is actively running and providing nearly immediate fault information.

21. The method as set forth in claim 18 wherein the processing comprises notifying an operator.

22. The method as set forth in claim 18 further comprising manually correcting the system.

23. The method as set forth in claim 22 wherein manual correction comprises adjusting the individual mandrel or the print blanket.

24. The method as set forth in claim 18 further comprising automatically correcting the system.

25. The method as set forth in claim 24 wherein the automatic correction comprises adjusting the individual mandrel or the print blanket.

26. The method as set forth in claim 18 wherein the images of the complete circumference of the peripheral surface of the individual container are at least one of color images, stitched images, and reassembled images.

27. The method as set forth in claim 18 wherein each container is imaged and the correlation information correlates each container to a mandrel or print blanket.

28. A method for controlling and optimizing the printing of patterns on peripheral surfaces of cylindrical can bodies by a can decorator machine which is integrally connected to an automated camera-based inspection system comprising multiple cameras to inspect the complete circumference of the periphery of each can at production speed soon after printing and a circularly symmetrical lighting module mounted to be above the individual can body being imaged to prevent specular reflections, the method comprising:

printing a pattern on the peripheral surface of each individual can carried by a mandrel of a mandrel wheel by making rolling contact with a print blanket which is carried on a speed synchronized print blanket wheel, the printing of the can bodies occurring at production speed in excess of 900 can bodies per minute;

inspecting and obtaining images of the complete circumference of the peripheral surface of each individual can by the multiple cameras of the automated camera-based inspection system during strobing of the lighting module to inspect for visual faults or variations in the printed pattern on each individual can body;

identifying at least one of the individual mandrel, print blanket, colors, and other machine components which were in contact with each individual can in the decorator machine;

generating and associating fault or variation information related to specific machine component adjustments that may be needed to further optimize or correct the decorating process, wherein the specific machine component adjustments are correlated to the individual mandrel, the corresponding print blanket, or the other machine components;

sending electrical signals to a control system operative to automatically make the recommended adjustments to the specific machine components in need of adjustment and maintaining in at least one database or module correlation information which correlates information on process variation, drift, anomalies, color accuracy and the fault or variation information to each individual print blanket and a log of at least one of fault or variation information, warnings issued, statistical trending indications, time stamps for variations, suggestions for adjustment, verifications that suggestions were followed and automatic adjustments effected.

29. The method as set forth in claim 28 wherein the additional step is taken of checking the decorated cans related to the change that was made to verify that the changes that were enacted did actually properly correct the process variation;

if the enacted change did not correct the decoration, recommending further changes to optimize the decoration process further; and, sending further electrical signals to the control system to automatically make the new recommended changes to further optimize the decoration.

30. The method as set forth in claim 28 wherein the images of the complete circumference of the peripheral surface of the individual container are at least one of color images, stitched images, and reassembled images.

31. An inspection and control system used with a printing system for printing patterns on peripheral surfaces of cylindrical containers, the printing system having a mandrel wheel having a plurality of mandrels disposed thereon, each mandrel being operative to carry an individual cylindrical container around a periphery of the mandrel wheel and a print blanket wheel having a plurality of print blankets disposed thereon, the print blanket wheel being adjustable, each print blanket being operative to print a pattern on a peripheral surface of the individual cylindrical container carried by one of the mandrels of the mandrel wheel, the printing of containers occurring at production speed in excess of 900 containers per minute, the inspection and control system comprising:

an automated camera-based inspection system comprising multiple cameras positioned around a periphery of the individual container being imaged and a circularly symmetrical lighting module mounted to be above the individual container being imaged to prevent specular reflections to obtain images of the complete circumference of the peripheral surface of the individual container and being operative to inspect the images for faults or variations in the printed pattern on the individual cylindrical container, the automated inspection system being operative to identify the individual mandrel which carried an individual cylindrical container and a corresponding print blanket that printed on the individual cylindrical container, and operative to generate fault or variation information;

a control system operative to receive the fault or variation information to facilitate correction of the printing system, wherein the control system is operative to provide suggestions for corrective adjustment of the printing system based on the fault or variation information, wherein the corrective adjustments are correlated to the individual mandrel, the corresponding print blanket, or the print blanket wheel; and, a storage module or database configured to maintain correlation information which correlates information on process variation, drift, anomalies, color accuracy and the fault or variation information to each individual print blanket and a log of at least one of fault or variation information, warnings issued, statistical trending indications, time stamps for variations, suggestions for adjustment, verifications that suggestions were followed and automatic adjustments effected.

32. The system as set forth in claim 31 wherein the images of the complete circumference of the peripheral surface of the individual container are at least one of color images, stitched images, and reassembled images.

33. The system as set forth in claim 31 wherein each container is imaged and the correlation information correlates each container to a mandrel or print blanket.

34. A method for controlling printing patterns on peripheral surfaces of cylindrical containers carried by mandrels of a mandrel wheel, the printing of containers occurring at production speed in excess of 900 containers per minute, the method comprising:

using an automated camera-based inspection system comprising multiple cameras positioned around a periphery of an individual cylindrical container being imaged and a circularly symmetrical lighting module mounted to be above the individual container being imaged to prevent specular reflections to obtain images of the complete circumference of the individual cylindrical container, and inspecting the images for faults or variations in a printed pattern on individual cylindrical container;

identifying, by the automated inspection system, an individual mandrel which carried an individual cylindrical container or a corresponding print blanket that printed on the individual cylindrical container;

generating fault or variation information, by the automated inspection system, based on detected faults or variations and the identifying;

processing the fault or variation information, by a control system, to facilitate correction of the pattern printing, wherein the control system is operative to provide suggestions for corrective adjustment of the pattern printing based on the fault or variation information, wherein the corrective adjustments are correlated to the individual mandrel or the corresponding print blanket; and maintaining in at least one database or module correlation information which correlates information on process variation, drift, anomalies, color accuracy and the fault or variation information to each individual print blanket and a log of at least one of fault or variation information, warnings issued, statistical trending indications, time stamps for variations, suggestions for adjustment, verifications that suggestions were followed and automatic adjustments effected.

35. The method as set forth in claim 34 wherein the images of the complete circumference of the peripheral surface of the individual container are at least one of color images, stitched images, and reassembled images.

36. The method as set forth in claim 34 wherein each container is imaged and the correlation information correlates each container to a mandrel or print blanket.

37. A system for printing patterns on peripheral surfaces of cylindrical containers comprising:

a mandrel wheel having a plurality of mandrels disposed thereon, each mandrel being operative to carry an individual cylindrical container around a periphery of the mandrel wheel;

a print blanket wheel having a plurality of print blankets disposed thereon, the print blanket wheel being adjustable, each print blanket being operative to print a pattern on a peripheral surface of the individual cylindrical container carried by each mandrel of the mandrel wheel, the printing of containers occurring at production speed in excess of 900 containers per minute;

a camera-based imaging inspection system comprising multiple cameras to position around a periphery of the individual container being imaged and a circularly symmetrical lighting module mounted to be above the individual container being imaged so as to prevent specular reflections to obtain images of the complete circumference of the peripheral surface of the individual container, wherein the images of the complete circumference of the peripheral surface of the individual container are at least one of color images, stitched images, and reassembled images, and being operative to inspect the images for faults or variations in the printed pattern on the individual cylindrical containers, the inspection system being operative to identify the individual mandrel which carried an individual cylindrical container and a corresponding print blanket that printed on the individual cylindrical container, and operative to generate fault or variation information; and, a control system operative to receive the fault or variation information to facilitate correction of the system, wherein the control system is operative to provide suggestions for corrective adjustment of the system based on the fault or variation information, wherein the corrective adjustments are correlated to the individual mandrel, the corresponding print blanket, or the print blanket wheel; and, a database configured to maintain correlation information which correlates information on process variation, drift, anomalies, color accuracy and the fault or variation information to each individual print blanket and a log of at least one of fault or variation information, warnings issued, statistical trending indications, time stamps for variations, suggestions for adjustment, verifications that suggestions were followed and automatic adjustments effected.

38. The system according to claim 37 further comprising motors or servo-systems for each mandrel to facilitate automated adjustment of the individual mandrels based on the fault or variation information.

39. The system according to claim 37 further comprising adjustable components for each mandrel and wherein adjustment of the individual mandrels is manual and based on the fault or variation information.

40. The system according to claim 37 further comprising motors or servo-systems for the print blanket wheel or individual print blankets to facilitate automated adjustment of the wheel based on the fault or variation information.

41. The system according to claim 37 wherein adjustment of the print blanket wheel or individual print blankets is manual and based on the fault or variation information.

42. The system according to claim 37 wherein adjustment of the individual mandrels, the print blanket wheel or individual print blankets comprises adjustment of pressure on the individual cylindrical containers during printing.

43. The system according to claim 37 wherein the cylindrical containers are cans.

44. The system according to claim 37 wherein the inspection system comprises an identification module to identify the individual mandrel, which carried an individual cylindrical container and a corresponding print blanket that printed on the individual cylindrical container, based on data from at least one of a part detection photo-detector, position one sensors, proximity detectors, counters and encoders.

45. The system according to claim 37 wherein the control system is operative to communicate the fault or variation information to an operator.

46. The system according to claim 45 wherein the control system communicates some aspect of the fault or variation information graphically on a video display.

47. The system according to claim 37 wherein the control system is a video inspection control system operative to communicate suggestions for corrective adjustment of the system to an operator based on the fault or variation information.

48. The system according to claim 37 wherein the control system examines the cylindrical containers on a realtime basis, while the system is actively printing but employs algorithms to determine if any of the observed process variations are statistically significant before utilizing the inspection data to recommend a change to the process.

49. The system according to claim 37 wherein the log is a secure log.

50. A method for controlling printing patterns on peripheral surfaces of cylindrical containers comprising:
printing a pattern on a peripheral surface of individual cylindrical containers carried by each of plural mandrels of the mandrel wheel, the printing of containers occurring at production speed in excess of 900 containers per minute;
using a camera-based imaging inspection system comprising multiple cameras positioned around a periphery of an individual cylindrical container being imaged and a circularly symmetrical lighting module mounted to be above the individual container being imaged so as to prevent specular reflections to obtain images of the complete circumference of the peripheral surface of the individual container, wherein the images of the complete circumference of the peripheral surface of the individual container are at least one of color images, stitched images, and reassembled images, inspecting the images for faults or variations in the printed pattern on the individual cylindrical containers by an inspection system;
identifying the individual mandrel which carried an individual cylindrical container or a corresponding print blanket that printed on the individual cylindrical container by the inspection system;
generating fault or variation information based on detected faults or variations and the identifying by the inspection system; and, processing the fault or variation information to facilitate correction of the printing by a control system, wherein the control system is operative to provide suggestions for corrective adjustment of the printing based on the fault or variation information, wherein the corrective adjustments are correlated to the individual mandrel or the corresponding print blanket; and,
maintaining at least one database which correlates information on process variation, drift, anomalies, color accuracy and the fault or variation information to each individual print blanket and a log of at least one of fault or variation information, warnings issued, statistical trending indications, time stamps for variations, suggestions for adjustment, verifications that suggestions were followed and automatic adjustments effected.

51. The method according to claim 50 wherein the cylindrical container is a metal can.

52. The method according to claim 50 wherein the inspecting is executed in a realtime manner while the system is actively printing and providing nearly immediate fault information.

53. The method according to claim 50 wherein the processing comprises notifying an operator.

54. The method according to claim 50 further comprising manually correcting the printing.

55. The method according to claim 50 wherein the individual mandrel or the print blanket is manually adjusted.

56. The method according to claim 50 further comprising automatically correcting the printing.

57. The method according to claim 50 wherein the individual mandrel or the print blanket is automatically adjusted.

58. A method for controlling and optimizing the printing of patterns on peripheral surfaces of cylindrical can bodies comprising:
integrally connecting a can decorator machine to an automated camera-based inspection system comprising multiple cameras to inspect the complete circumference of the periphery of each can at production speed soon after printing and a circularly symmetrical lighting module mounted to be above the individual can being imaged so as to prevent specular reflections;
printing a pattern on the peripheral surface of each individual can carried by each of plural mandrels of the mandrel wheel by making rolling contact with a print blanket which is carried on a speed synchronized print blanket wheel, the printing of can bodies occurring at production speed in excess of 900 cans per minute;
obtaining images of the complete circumference of the peripheral surface of each individual can body by the multiple cameras of the automated camera-based inspection system during strobing of the lighting module and inspecting the images for visual faults or variations in the printed pattern on each individual can body by the automated camera-based inspection system, wherein the images of the complete circumference of the peripheral surface of the individual can body are at least one of color images, stitched images, and reassembled images;
identifying at least one of the individual mandrel, print blanket, colors, and other machine components which were in contact with each individual can in the can decorator machine;
generating and associating fault or variation information related to specific machine component adjustments that may be needed to further optimize or correct the decorating process, wherein the specific machine component adjustments are correlated to the individual mandrel, the corresponding print blanket, or the other machine components;

sending electrical signals to a control system operative to automatically make the recommended adjustments to the specific machine components in need of adjustment; and maintaining at least one database which correlates information on process variation, drift, anomalies, color accuracy and the fault or variation information to each individual print blanket and a log of at least one of fault or variation information, warnings issued, statistical trending indications, time stamps for variations, suggestions for adjustment, verifications that suggestions were followed and automatic adjustments effected.

59. The method according to claim 58 wherein the additional step is taken of checking the decorated cans related to the change that was made to verify that the changes that were enacted did actually properly correct the process variation;

if the enacted change did not correct the decoration, recommending further changes to optimize the decoration process further; and, sending further electrical signals to the control system to automatically make the recommended further changes to further optimize the decoration.

60. An inspection and control system used with a printing system for printing patterns on peripheral surfaces of cylindrical containers, the printing system having a mandrel wheel having a plurality of mandrels disposed thereon, each mandrel being operative to carry an individual cylindrical container around a periphery of the mandrel wheel and a print blanket wheel having a plurality of print blankets disposed thereon, the print blanket wheel being adjustable, each print blanket being operative to print a pattern on a peripheral surface of the individual cylindrical container carried by one of the mandrels of the mandrel wheel, the printing of containers occurring at production speed in excess of 900 containers per minute, the inspection and control system comprising:

an automated camera-based inspection system comprising multiple cameras to position around a periphery of the individual container being imaged and a circularly symmetrical lighting module mounted to be above the individual container being imaged so as to prevent specular reflections to obtain images of the complete circumference of the peripheral surface of the individual container, wherein the images of the complete circumference of the peripheral surface of the individual container are at least one of color images, stitched images, and reassembled images, and being operative to image-inspect the cylindrical containers for faults or variations in the printed pattern on the individual cylindrical containers, the automated camera-based inspection system being operative to identify the individual mandrel which carried an individual cylindrical container and a corresponding print blanket that printed on the individual cylindrical container, and operative to generate fault or variation information;

a control system operative to receive the fault or variation information to facilitate correction of the printing system, wherein the control system is operative to provide suggestions for corrective adjustment of the printing system based on the fault or variation information, wherein the corrective adjustments are correlated to the individual mandrel, the corresponding print blanket, or the print blanket wheel; and, a database which correlates information on process variation, drift, anomalies, color accuracy and the fault or variation information to each individual print blanket and a log of at least one of fault or variation information, warnings issued, statistical trending indications, time stamps for variations, suggestions for adjustment, verifications that suggestions were followed and automatic adjustments effected.

61. A method for controlling printing patterns on peripheral surfaces of individual cylindrical containers carried by each of plural mandrels of a mandrel wheel, the printing of containers occurring at production speed in excess of 900 containers per minute, the method comprising:

image-inspecting, by an automated camera-based inspection system comprising multiple cameras positioned around a periphery of an individual cylindrical container being imaged and a circularly symmetrical lighting module mounted to be above the individual container being imaged so as to prevent specular reflections to obtain images of the complete circumference of the individual cylindrical container, wherein the images of the complete circumference of the peripheral surface of the individual container are at least one of color images, stitched images, and reassembled images, the cylindrical containers for faults or variations in a printed pattern on individual cylindrical containers;

identifying, by the automated camera-based inspection system, an individual mandrel which carried an individual cylindrical container or a corresponding print blanket that printed on the individual cylindrical container;

generating fault or variation information, by the automated camera-based inspection system, based on detected faults or variations and the identifying;

processing the fault or variation information, by a control system, to facilitate correction of the pattern printing, wherein the control system is operative to provide suggestions for corrective adjustment of the pattern printing based on the fault or variation information, wherein the corrective adjustments are correlated to the individual mandrel or the corresponding print blanket; and maintaining at least one database which correlates information on process variation, drift, anomalies, color accuracy and the fault or variation information to each individual print blanket and a log of at least one of fault or variation information, warnings issued, statistical trending indications, time stamps for variations, suggestions for adjustment, verifications that suggestions were followed and automatic adjustments effected.

* * * * *